Nov. 27, 1956 L. H. WIRSIG 2,771,729

DOUBLE DUTY DISK HARROW

Filed April 24, 1950 3 Sheets-Sheet 1

Inventor

Leo H. Wirsig.

By K. M. Thorpe

Attorney

Nov. 27, 1956 L. H. WIRSIG 2,771,729

DOUBLE DUTY DISK HARROW

Filed April 24, 1950 3 Sheets-Sheet 2

INVENTOR.
Leo H. Wirsig.
BY K M Thorpe
atty.

Nov. 27, 1956 L. H. WIRSIG 2,771,729

DOUBLE DUTY DISK HARROW

Filed April 24, 1950 3 Sheets-Sheet 3

Leo H. Wirsig Inventor

By K. M. Thorpe Attorney

United States Patent Office 2,771,729

Patented Nov. 27, 1956

2,771,729

DOUBLE DUTY DISK HARROW

Leo H. Wirsig, Deepwater, Mo.

Application April 24, 1950, Serial No. 157,671

2 Claims. (Cl. 55—81)

This invention relates to a double duty disk harrow, or combined disk harrow and ridge leveler. In the growing of some crops the field is thrown up into a series of parallel ridges and to level the same and prepare a good seed bed for a following crop, good farming practice requires that the ridges be broken down or levelled. Under present cultivation methods, to level the ridges, a special implement is required, or each ridge must be individually worked or the ground must be worked both longitudinally and transversely of the ridges. At the present time most crops are planted forty two inches between rows, and the construction of the invention is illustrated as adapted for this spacing, but it is to be understood that the disks of the invention may be arranged for any other desired spacing.

One of the objects of the present invention is to produce a disk harrow which is adjustable so that it may be set to split or level a plurality of ridges at one pass. For convenience of illustration it is shown as levelling three ridges simultaneously, or it can be set to perform ordinary disking operations. With a structure of this kind it is possible, in many cases, to prepare a field for further operations with only one pass longitudinally of the ridges.

In the drawings forming a part of the application, a two section disk harrow is shown, each section throwing the dirt in opposite directions, but it is to be understood the device is adapted to tandem hitches or other disk arrangements. It is also to be understood the invention is not limited to sizes of disks or to any particular spacing thereof. The drawings, for convenience show three sets of disks in each section, but more than three may be used if desired, preferably cooperating in pairs as will hereinafter appear.

With the general objects named in view and others as will hereinafter appear, the invention consists in certain novel and useful features of construction and organization of parts as hereinafter described and claimed; and in order that it may be fully understood, reference is to be had to the accompanying drawings, in which:

Figures 1, 2, 3, 4:
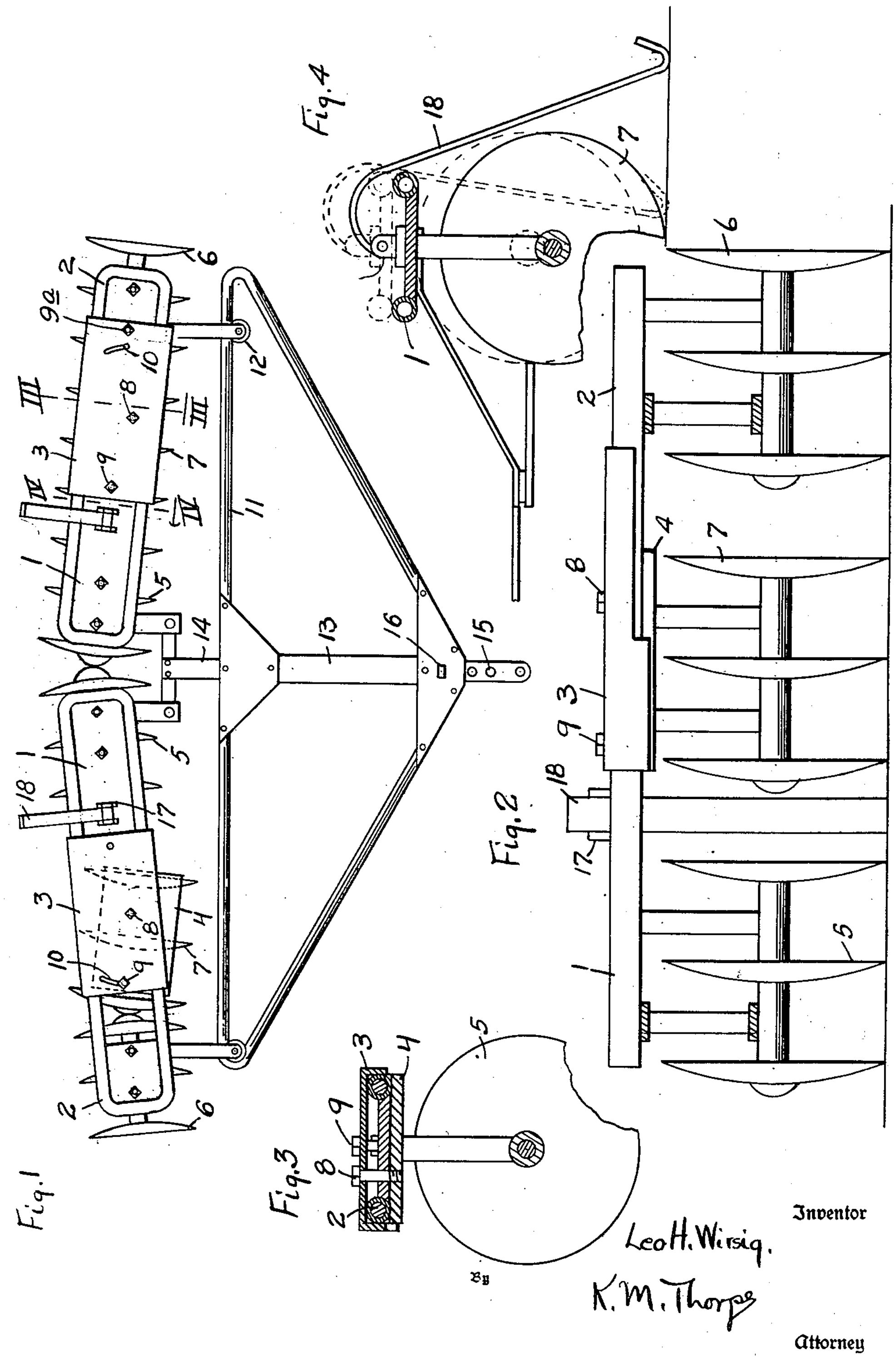
Figure 1 is a top plan view of a two section disk harrow, each section comprising of a gang of three disks, the disks being assumed to be spaced on 6″ centers, thus the eighth disk, counted outwardly from the center, is on a 42″ ridge line.
Figure 2 is an enlarged section taken just in front of the draw bar of the right-hand section.
Figure 3 is an enlarged section on the line III—III of Figure 1.
Figure 4 is an enlarged section on the line IV—IV of Figure 1.

In the said drawings, where like reference characters identify corresponding parts in all of the figures, it is to be understood that under present commercial practices disk harrows are usually made in one of two standard spacings, namely 6″ and 7″ between disks. It will thus be apparent that normally the eighth disk in a 6″ spacing tracks a ridge, while the seventh disk in a 7″ spacing tracks the ridge, the ridges being on 42″ centers. In practice, to regulate the depth of cultivation, the disk harrow sections must bear an angular relation as shown, throwing the earth in opposite directions with the center disks of the sections being in abutting relation to center the drag or pull on the tongue.

In Figures 1 through 4 inclusive, the main frame comprises a pair of telescopic sections, 1, the inner, and 2, the outer, reinforced by an overlying plate 3 having downturned side edges which form telescopic guides for the longitudinal adjustment of frame member 2 in relation to frame member 1, as will hereinafter more particularly appear. These two main frame members are always in longitudinal alinement so that when the implement is in use, the two are in effect integral or continuous. Underlying the lower faces of the main disk frame 1—2 and carried by the plate 3 as will hereinafter appear, is a subframe. Depending respectively from the sections 1 and 2, and from the subframe 4, are equi-spaced disk gangs 5, 6 and 7, each set comprising a disk gang of three blades each, which are normally arranged in alinement as shown in Figure 1. All disks of each gang ordinarily throw the dirt in the same direction, the center disk of gang 6, the eighth disk out, tracking the ridge. When the disks are in this position, if desired, removable thrust spools, not shown, may be inserted between the end disks of gang 7, and the adjacent disks of gangs 5 and 6, so that all thrust will be transmitted to the standard bumper washers between the inner disk harrows of the two sections as is common in disks.

When the center disk gang 7 is to be reversed for ridge splitting purposes, main frame member 2 and its disk gang 6 is moved outwardly 6″, that is until its innermost disk tracks the line originally tracked by the center disk of gang 6. The plate 3 carries a pair of bolts 8 and 9 which support the sub-frame 4 carrying the disk gang 7. When it is desired to reverse the gang 7 and place it in the position shown to the left in Figure 1, the bolt 9 is removed, sub-frame 4 is rotated or swivelled on the bolt 8 until what was the inner disk with its bumper, becomes the outer disk, and contacts the inner disk of the gang 6 as shown. Bolt 9 is now re-engaged with the sub-frame 4 through the adjusting slot 10, or any other suitable arrangements may be made, to allow for angular compensation. It will thus be apparent that bolts 8 and 9 cooperate together to provide a pair of clamping means to hold the main and sub-frames in adjusted relation. In order to prevent any possibility of outward creeping of telescopic main frame 2 when the disk gangs are alined, plate 3 is preferably long enough to be engaged by bolt 9*a*, thus said frame section 2 is locked to the section 1.

Although any convenient draw bar or tongue may be employed, one convenient method is to provide a relative triangular frame 11 which is attached by pull straps having pulleys 12 rolling along the back of the frame 11. The frame 11 is bisected by a reinforcing bar 13 which slidingly supports a tongue 14 connected to the inner ends of the main disk harrow sections 1 by any suitable arrangement of pivoted levers. The draw bar 14 may be adjusted longitudinally of the member 13 by means of a series of holes 15 and a locking pin 16, whereby the angular relation of the main disk frames may be set according to the depth of cut desired, the greater the angle the greater the cut, as common with disk harrow of this general character.

Although the disk gang 7 may be reversed or adjusted in the most convenient manner, one method of accomplishing this is to raise the disk gangs out of ground contact as by means of a pair of spaced ears 17 on top of the inner section 1. Pivoted to said ears is a trailing lever 18 in ground contact. When the main disk frame is to be elevated, backing force is applied to the draw frame, which causes the lever 18 to embed itself into the ground and act as a fulcrum, swinging into the dotted line position of Figure 4, and lifting the disk frame from ground contact. Bolts 8 and 9 may now be manipulated as above described. It is to be noted that power means might be substituted for the manual mechanism shown herein.

Figures 5, 6, 7:
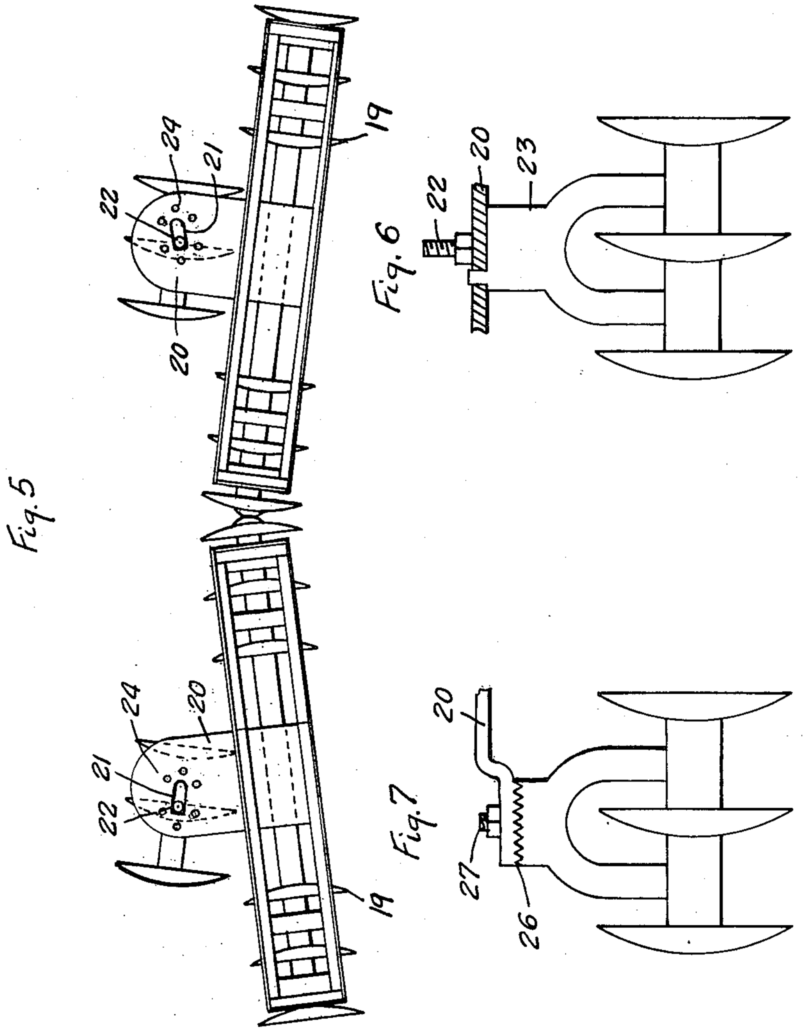
Figure 5 is a top plan view of a pair of disk harrow sections in which the adjustable gang of disks trails the other gangs, the weight of the tongue or tow bar being utilized to elevate the trailing or adjustable disk set.
Figures 6 and 7 are enlarged details of alternative methods of adjustably securing the trailing disks.

In Figure 5 a disk is shown in which the spacing between the blades is assumed to be 7″, which places the disks 19 of each section on the 42″ line of standard rows. In this type of construction, the outermost gang of disks does not need to be longitudinally adjusted for ridge splitting purposes, and the center or adjustable disk gang may trail or lead the other sections. For convenience a trailing disk gang arrangement is shown, in which a plate 20 projects rearwardly from the main frame, said plate having a slot 21 to receive a bolt 22 projecting upwardly from a casting or sub-frame 23 carrying the center gang of three disks. The ends of the slot 21 are spaced from a series of holes 24 which adjustably receive a pin 25 projecting from sub-frame 23 to lock the disk gang at the desired angle. In Figure 7, a rosette arrangement 26 for locking cooperation with bolt 27 is illustrated. When the parts are reversed as shown to the left in Figure 5, the outermost disk of the center gang tracks the disk 19 and, therefore, assists in splitting a ridge. In this connection it is to be noted that by dropping the disk tongue, the trailing disks are elevated from the ground for adjustment purposes.

Figures 8, 9, 10:
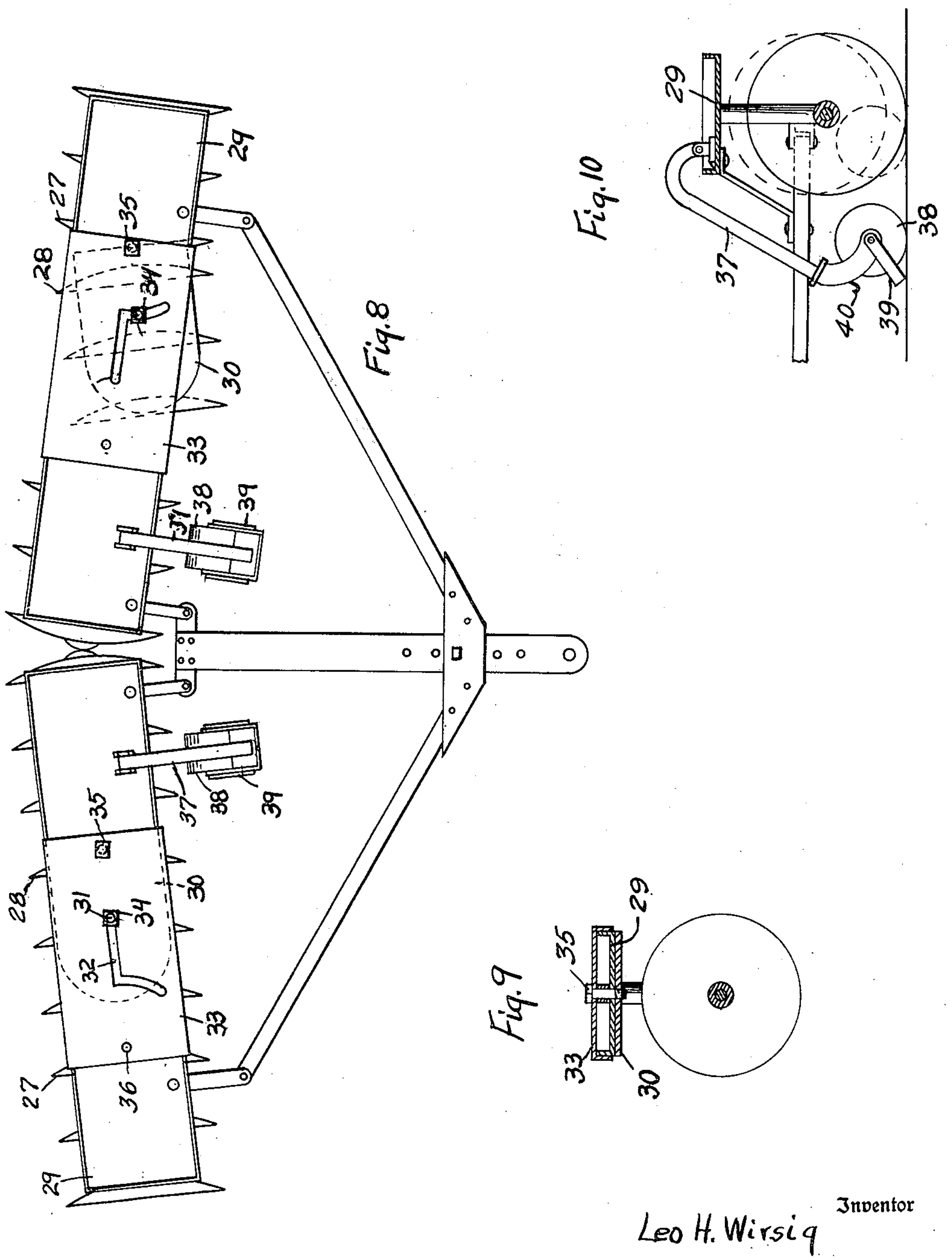
Figure 8 is a top plan view of a two section disk harrow, each section comprising a gang of three disks, the disks being assumed to be spaced on 7″ centers, thus the seventh disk, counted from the center outwardly, is on a 42″ ridge line.
Figure 9 is a cross section to show the sub-frame carrying the center or adjustable gang of disks.
Figure 10 is a cross section to illustrate the operation of the combined lifting elevator and wheeled dolly.

In Figures 8, 9 and 10, a seven inch disk spacing is shown, which places disks 27, the innermost of the outer gang of three disks, on the ridge or 42″ line. Thus with a 7″ spacing the outer disk gang needs no longitudinal adjustment and to accomplish ridge splitting it is necessary to reverse and angle the center disk gang to place its normally innermost disk blade 28 into abutting relation with the disk blade 27. One convenient arrangement is to provide a rigid main frame 29 carrying inner and outer disk gangs of three blades each, all blades being on 7″ centers. Underlying the main frame 29 is a sub-frame or plate 30 which, in the construction shown, carries an upstanding stud bolt 31 which passes through and is adjustable in an L-shaped slot 32 in the main frame 29 and in an overlying reinforcing channel 33. The stud bolt 31 acts as a pivot around which sub-frame 30 rotates, said bolt and frame being held against falling away by a nut 34.

Sub-frame 30 in normal disking position is shown in the left hand section, Figure 8, and is locked by machine bolt 35 threaded into a tapped hole in sub-frame 30, see Figure 9. When it is desired to reverse the center disk gang and move same outwardly into angular relation for ridge splitting purposes, bolt 35, left hand side of Figure 8, is removed. Nut 34 is now loosened and sub-frame 30 is rotated on the bolt 31. The sub-frame and its bolt 31 are now slid in slot 32 until machine bolt 35 can be engaged with the reversed sub-frame by passing the bolt downwardly through registering openings 36 in plate 33 and main frame 29. Bolt 35 may now act as a center while sub-frame 30 and its bolt 31 are moved outwardly to proper angular position as shown to the right in Figure 8. The bolts are now tightened to lock the parts for ridge splitting purposes.

In Figures 8 and 10, a combined section lift and wheeled dolly is shown. The arrangement illustrated comprises a goose neck lever 37 pivoted to frame 29 and equipped with a caster wheel or roller 38 of relatively broad ground engaging area so it will not sink in rough or soft ground. The device is illustrated in full lines as just about ready to elevate the disk section. By preference the lift is fully automatic as by providing a ground engaging stirrup 39 which normally is held out of ground contact by a hook 40. Assuming however that the stirrup is in ground contact as shown and the disk harrow is being pulled by a tractor, eventually stirrup 39 will strike an unyielding obstruction such as created by piling up the earth. When this occurs the stirrup will cause lifting of the disk harrow section out of ground contact, continued forward movement of the frame causing the wheel 38 to swing arm 37 to the dotted line position, the stirrup also moving to trail the wheel. The part is now supported as on a dolly for transport from field and the stirrup may be swung up to rest on the caster above and behind the dolly wheel.

From the above description and drawings it will be apparent that I have produced a construction embodying all of the features of advantage set forth as desirable, and while I have described and illustrated the preferred embodiment it is to be understood that I reserve the right to all changes within the spirit and scope of the appended claims.

I claim:

1. A disk harrow comprising a pair of main frame members, a plate telescopically securing the main frame members and holding them in longitudinal alinement, axially alined spaced disk harrow gangs facing in the same direction journaled to each member of the main frame, a sub-frame disk gang swivelled to the plate to turn substantially end for end in a horizontal plane and having the axis of its disk gang alined with and the disks facing in the same direction as the axes and disks respectively of the main frame disk gangs when the main frames are telescoped together, clamping means associated with the main and sub-frames to hold the sub-frame in position when the main frames are telescoped together, and additional clamping means associated with said main and sub-frames to hold the sub-frame rotated substantially end for end when the main frames are telescoped apart.

2. A disk harrow comprising a pair of main frames arranged in angular relation, a sub-frame in a horizontal plane below the horizontal plane of each main frame and swivelled to and longitudinally shiftable in relation to the main frames, clamping means to lock the sub-frames in either of two positions of adjustment, a plurality of disk harrow gangs journaled to each main frame to respectively face in opposite directions with the initial disks of the end gang of each frame in adjacent relation, and a disk harrow gang journaled in each sub-frame, said sub-frame gangs normally facing in the same direction as their respective main frame disk gangs when the sub-frames are in one position, the sub-frame disk gangs being reversed to face in the opposite direction and to have one disk closely adjacent a disk of its respective main frame gang when the sub-frames are swivelled and longitudinally shifted to their other position of adjustment.

References Cited in the file of this patent

UNITED STATES PATENTS

| | | |
|---|---|---|
| 514,208 | Clark | Feb. 6, 1894 |
| 1,025,767 | Waterman | May 7, 1912 |
| 1,617,997 | Erickson | Feb. 15, 1927 |
| 2,002,272 | Mowry | May 21, 1935 |
| 2,141,805 | White | Dec. 27, 1938 |
| 2,211,560 | Espe | Aug. 13, 1940 |
| 2,431,959 | Olson et al. | Dec. 2, 1947 |
| 2,493,230 | Dilley | Jan. 3, 1950 |
| 2,529,039 | Meyer | Nov. 7, 1950 |
| 2,621,459 | Scott | Dec. 16, 1952 |

FOREIGN PATENTS

| | | |
|---|---|---|
| 14,444/33 | Australia | Aug. 13, 1934 |